(12) United States Patent
Takahashi et al.

(10) Patent No.: US 6,542,670 B1
(45) Date of Patent: Apr. 1, 2003

(54) WAVELENGTH DEMULTIPLEXER

(75) Inventors: Hiromi Takahashi, Tokyo (JP); Hideki Ono, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 294 days.

(21) Appl. No.: 09/688,976

(22) Filed: Oct. 17, 2000

(30) Foreign Application Priority Data

Apr. 19, 2000 (JP) ........................................ 2000-118201

(51) Int. Cl.[7] .................................................. G02B 6/42
(52) U.S. Cl. .............................. 385/45; 385/14; 385/43
(58) Field of Search ............................. 385/45, 43, 24, 385/14

(56) References Cited

U.S. PATENT DOCUMENTS 6,085,000 A  * 7/2000 Tanaka et al. ................. 385/45
6,243,516 B1 * 6/2001 Seino ........................... 385/14

OTHER PUBLICATIONS

"Silica–based WDM using Multilayered Dielectric Filter", 1995 Denshi Jouhou Tsushin Gakkai Electronics Society Taikai C–229.

"Development of Silica–based PLC Coupler by TEOS Low Temperature Plasma CVD", Shingaku Gihou EMD 96–36, CPM 96–59, OPE 96–58, LQE 96–60 (Aug. 1996).

* cited by examiner

*Primary Examiner*—Hung N. Ngo
(74) *Attorney, Agent, or Firm*—Wenderoth, Lind & Ponack, L.L.P.

(57) ABSTRACT

A wavelength demultiplexer is provided whose overall length in a first propagation direction is short, whose production efficiency is high, and whose emission loss is smaller than that of conventional configurations. At the first end face V1, the first boundary line F1 is closer to the second edge H2 than the first edge H1 by the distance "b" (b>0). At the first end face V1, the second boundary line F2 is closer to the first edge H1 than the second edge H2 by the distance "b". At the third end face V3, the fourth boundary line F4 is closer to the fourth edge H4 than the third edge H3 by the distance "a" (a>0). At the fourth end face V4, the sixth boundary line F6 is closer to the third edge H3 than the fourth edge H4 by the distance "a".

11 Claims, 7 Drawing Sheets emission loss as distance "a" varies emission loss as distance "b" varies

WAVELENGTH DEMULTIPLEXER

BACKGROUND OF THE INVENTION

1. Field of the Invention

The present invention relates to a wavelength demultiplexer used for optical communications.

2. Description of Related Art

In recent years, there have been considerable advances in the research and development of wavelength demultiplexers for realizing FTTH (fiber to the home) systems.

As one such wavelength demultiplexer, which is shown in FIG. 6, a reflection-type wavelength demultiplexer provided with a dielectric multilayer filter has been proposed (see, for example, 1995 Denshi Jouhou Tsuushin Gakkai Electronics Society Taikai C-229, or Shingaku Gihou EMD 96-36, CPM 96-59, OPE 96-58, LQE 96-60 (1996-08)).

FIG. 6 is a schematic top view showing waveguide portions and a dielectric multilayer filter 16 of a reflection-type wavelength demultiplexer provided with a Y-branching waveguide 14 (referred to as "wavelength demultiplexer A" in the following), disclosed in these documents.

When wavelength multiplexing light SP including first wavelength light S1 and second wavelength light S2 is input into an optical waveguide 18 for wavelength multiplexing light, the dielectric multilayer filter 16 transmits the first wavelength light S1 and inputs it into the Y-branching waveguide 14, and reflects the second wavelength light S2, which is input into a reflection-light waveguide 20, thus demultiplexing the wavelength multiplexing light SP.

The Y-branching waveguide 14 includes a main waveguide 22, a tapered waveguide 24 for widening the waveguide width, and first and second branching waveguides 26 and 28. After the first wavelength light S1 that has been input into the Y-branching waveguide 14 has been propagated through the main waveguide 22 and the tapered waveguide 24 for widening the waveguide width, it branches into the first and the second branching waveguides 26 and 28, and is output to the outside.

However, for the configuration of optical communication modules using such reflection-type wavelength demultiplexers, the waveguides are formed so that the input direction and the output direction of the wavelength demultiplexer coincide with one another (that is, they are parallel to each other). As will be explained in the following, the input direction and the output direction correspond to a first propagation direction $L_1$. This means, that the main waveguide 22 is connected to the dielectric multilayer filter 16 in a second propagation direction L2, in order to reduce the emission loss of input first wavelength light S1. The center line of the main waveguide 22 bends smoothly until it runs in the first propagation direction L1. First and second branching waveguides 26 and 28, whose center lines are arranged symmetrically to one another, are connected to this main waveguide 22. At a third port P3 and a fourth port P4, the center lines of the first and second branching waveguides 26 and 28, too, run in the first propagation direction L1.

However, the wavelength demultiplexer A disclosed in the above-noted documents has the disadvantage that it has a structure that is long with respect to the first propagation direction L1.

To remove this disadvantage, a reflection-type wavelength demultiplexer has been proposed in which the dielectric multilayer filter 16 is arranged obliquely against the input direction LA (referred to as "wavelength demultiplexer B" in the following), as shown in FIG. 7. Like FIG. 6, FIG. 7 is a top view showing the wavelength demultiplexer B.

However, the production efficiency for the wavelength demultiplexer B is poor. The following explains the reasons for this. FIG. 8 is a top view of a series of three chips arranged next to each other under the same orientation on a wafer for forming wavelength demultiplexers B. Grooves 36 for inserting a dielectric multilayer film (in the drawings, these grooves are indicated by hatching) are formed on the surface of the chips, but these grooves 36 are arranged at an angle, so that they are not on a common straight line and the grooves 36 on the chips of one series of reflection-type wavelength demultiplexers cannot be formed by dicing in one step. Consequently, as mentioned above, the production efficiency for the wavelength demultiplexer B is poor.

On the other hand, the production efficiency for the wavelength demultiplexer A is higher than that for the wavelength demultiplexer B. The reason for this is explained in the following. Like FIG. 8, FIG. 9 is a top view, of a series of three chips arranged next to each other under the same orientation on a wafer for forming wavelength demultiplexer A. Grooves 36 for inserting a dielectric multilayer film (in the drawings, these grooves are indicated by hatching) are formed on the surface of the chips, but these grooves 36 are formed on a common straight line, so that the grooves 36 on the chips of one series of reflection-type wavelength demultiplexers can be formed by dicing in one step. Consequently, as mentioned above, the production efficiency for the wavelength demultiplexer A is high.

SUMMARY OF THE INVENTION

It is therefore an object of the present invention to provide a wavelength demultiplexer whose overall length in the first propagation direction is short, whose production efficiency is high, and whose emission loss is smaller than that of the above-described conventional configurations.

In order to attain this object, a wavelength demultiplexer of the present invention includes a wavelength demultiplexing portion and a Y-branching waveguide. The wavelength demultiplexing portion demultiplexes a specific wavelength of light from wavelength multiplexing light that has been input into the wavelength demultiplexer in a first propagation direction and then outputs the specific wavelength of light in a second propagation direction that is different from the first propagation direction. The Y-branching waveguide outputs the specific wavelength of light, which has been input into the Y-branching waveguide in the second propagation direction, in the first propagation direction. The Y-branching waveguide includes a main waveguide, a tapered waveguide, a first branching waveguide, and a second branching waveguide. The main waveguide is connected to the wavelength demultiplexing portion. The tapered waveguide is connected to the main waveguide and widens the waveguide width. The first branching waveguide and the second branching waveguide are both connected to the tapered waveguide.

In this configuration, the main waveguide is a straight waveguide whose center line is oriented in the second propagation direction. After bending the center line of the first branching waveguide along a smooth first curved line away from the second branching waveguide, a tangential direction of the first curved line coincides with the first propagation direction. After bending the center line of the second branching waveguide along a smooth second curved line away from the first branching waveguide, and after bending it along a smooth third curved line, which is connected to the second curved line in the tangential direction of the second curved line, into a direction towards the first branching waveguide, the tangential direction of the third curved line coincides with the first propagation direction.

Moreover, when a shape of the Y-branching waveguide is seen as a "Y", at least one of a first condition and a second condition is satisfied.

The first condition is that an entire first end face of the main waveguide is connected to a portion of a second end face of the tapered waveguide arranged in opposition to the first end face.

The second condition is that an entire third end face of the first branching waveguide and an entire fourth end face of the second branching waveguide are connected to a portion of a fifth end face of the tapered waveguide, respectively, the fifth end face being arranged in opposition to the third end face and the fourth end face.

With this configuration, the first branching waveguide and the second branching waveguide can be made shorter with respect to the first propagation direction, which corresponds to the input and output directions. Here, "smooth curved line" means a curved line that is continuously differentiable. Moreover, by configuring the tapered waveguide as described above, the propagation loss of optical signals propagated along the tapered waveguide can be reduced.

In this embodiment, it is preferable that each shape of the second end face and of the fifth end face is substantially a straight line. The two edges of the second end face are a first edge and a second edge. The two edges of the fifth end face are a third edge and a fourth edge. Under the first condition, the first end face is enclosed by the first edge and the second edge. In the second condition, the third end face and the fourth end face are enclosed by the third edge and the fourth edge.

In this embodiment, it is preferable that, satisfying the first and the second conditions, the main waveguide includes a first boundary line and a second boundary line. The first branching waveguide has a third boundary line and a fourth boundary line, the latter being further away from the second branching waveguide. The second branching waveguide has a fifth boundary line and a sixth boundary line, the latter being further away from the first branching waveguide. At the first end face, the first boundary line is closer to the second edge than the first edge by the distance "b" (b>0). At the first end face, the second boundary line is closer to the first edge than the second edge by the distance "b". At the third end face, the fourth boundary line is closer to the fourth edge than the third edge by the distance "a" (a>0). At the fourth end face, the sixth boundary line is closer to the third edge than the fourth edge by the distance "a".

The widths of the main waveguide, the first branching waveguide and the second branching waveguide are for example 8 $\mu$m. The thicknesses of the main waveguide, the first branching waveguide and the second branching waveguide are for example 6 $\mu$m. The distance between the third boundary line at the third end face and the fifth boundary line at the fourth end face is 3.5 $\mu$m. Then the distance "a" can be 1 $\mu$m, and the distance "b" can be a constant value in the range of 0 $\mu$m<b<1.25 $\mu$m.

In the above embodiment, it is preferable that, satisfying the first condition, the main waveguide includes a first boundary line and a second boundary line. The first branching waveguide has a third boundary line and a fourth boundary line, the latter being further away from the second branching waveguide. The second branching waveguide has a fifth boundary line and a sixth boundary line, the latter being further away from the first branching waveguide. At the first end face, the first boundary line is closer to the second edge than the first edge by the distance "b" (b>0). At the first end face, the second boundary line is closer to the first edge than the second edge by the distance "b".

In the above embodiment, it is preferable that, satisfying the second condition, the main waveguide includes a first boundary line and a second boundary line. The first branching waveguide has a third boundary line and a fourth boundary line, the latter being further away from the second branching waveguide. The second branching waveguide has a fifth boundary line and a sixth boundary line, the latter being further away from the first branching waveguide. At the third end face, the fourth boundary line is closer to the fourth edge than the third edge by the distance "a" (a>0). At the fourth end face, the sixth boundary line is closer to the third edge than the fourth edge by the distance "a".

The widths of the main waveguide, the first branching waveguide and the second branching waveguide are 8 $\mu$m. The thicknesses of the main waveguide, the first branching waveguide and the second branching waveguide are 6 $\mu$m. The distance between the third boundary line at the third end face and the fifth boundary line at the fourth end face is 3.5 $\mu$m. Then, the distance "b" can be 0 $\mu$m, and the distance "a" can be a constant value in the range of 0 $\mu$m<a<3.0 $\mu$m.

With this configuration, the propagation loss of the optical signal propagated along the tapered waveguide can be reduced.

For the embodiment of the present invention, it is preferable that the curved portion of the first curved line is a circular arc.

In that case, the overall length of the first branching waveguide along the first propagation, which corresponds to the input direction (and also the output direction) is shortened. For the curvature radius of the circular arc, a radius should be selected at which the emission loss is minimal.

For the embodiment of the present invention, it is preferable that the second curved line is a circular arc, and that the curved portion of the third curved line is a circular arc.

In that case, the length of the second branching waveguide with respect to the input and output direction, that is, in the first propagation direction, can be made shorter. For the curvature radii of the circular arcs, radii should be selected at which the emission loss is minimal.

For the embodiment of the present invention, it is preferable that the circular arc of the third curved line is connected to the second curved line.

In that case, the overall length of the second branching waveguide with respect the first propagation direction, which corresponds to the input and output direction, can be made shorter.

For the embodiment of the present invention, it is preferable that the wavelength demultiplexing portion is a reflection-type wavelength demultiplexing portion using a dielectric multilayer filter.

In that case, the grooves for inserting a dielectric multilayer film can be formed by cutting the chips in one straight line on the surface of the series of chips on the wafer on which the wavelength demultiplexers are formed. Consequently, the grooves of the chips for the same series of wavelength demultiplexers can be formed by dicing in one step. Thus, the production efficiency for the wavelength demultiplexer is high.

BRIEF DESCRIPTION OF THE DRAWINGS

The foregoing and other objects, features and advantages of the present invention will be better understood from the following description taken in connection with the accompanying drawings, in which.

DESCRIPTION OF THE PREFERRED EMBODIMENTS

Figure 1:
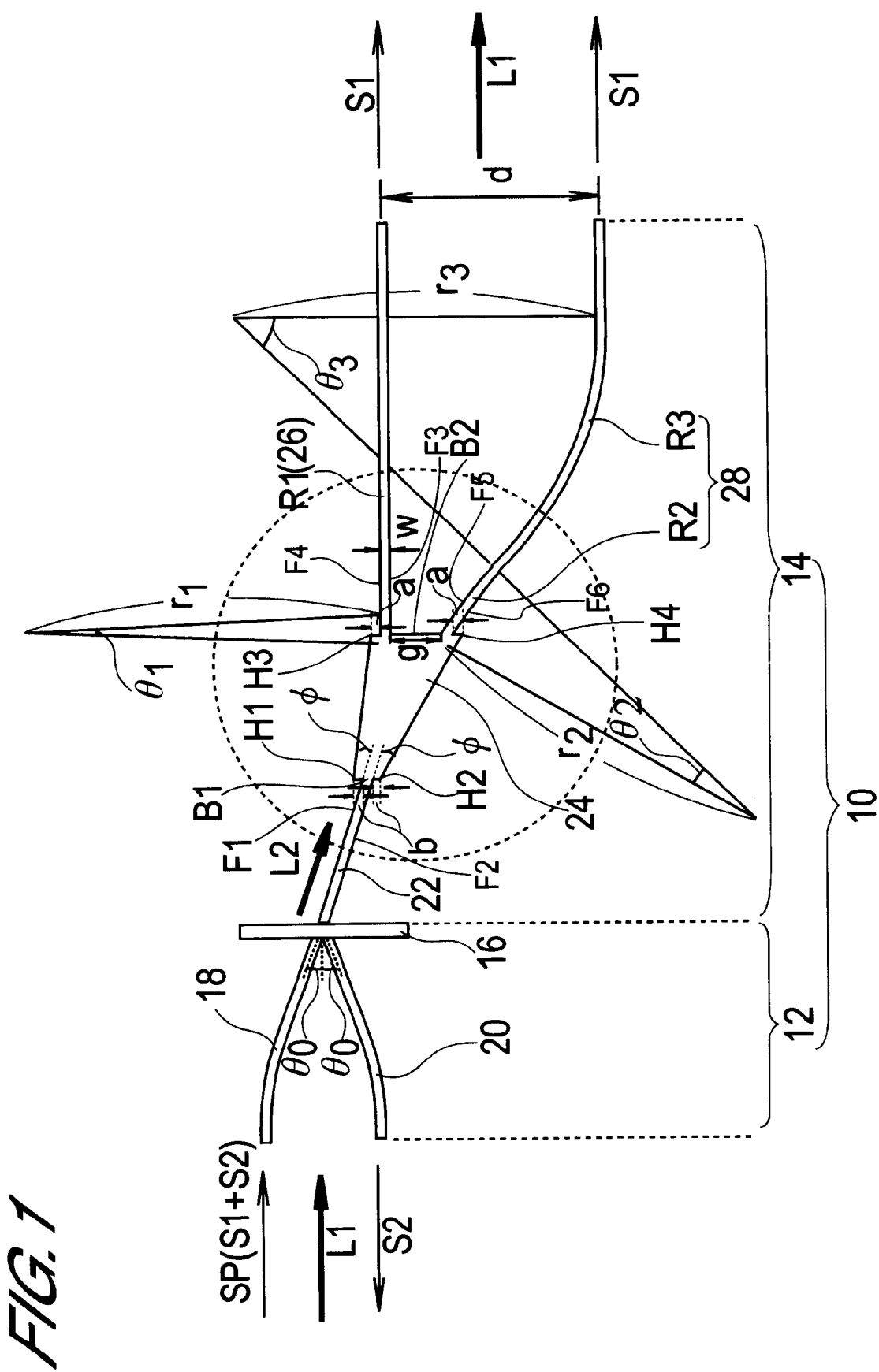
FIG. 1 is a top view showing waveguide portions and a dielectric multilayer filter of a wavelength demultiplexer of the present invention.

The following is an explanation of an embodiment of a wavelength demultiplexer in accordance with the present invention, with reference to the accompanying drawings. It should be noted that these drawings show an outline of shape, size and arrangement of the structural components only to an extent necessary for appreciating the present invention, and consequently, the present invention is not limited to the examples shown in the drawings. Also, the numerical values in the following explanations are merely examples, and not intended to limit the present invention in any way.

First, an example of the configuration of a wavelength demultiplexer 10 in accordance with the present invention is explained with reference to FIGS. 1 to 3.

Figure 2:
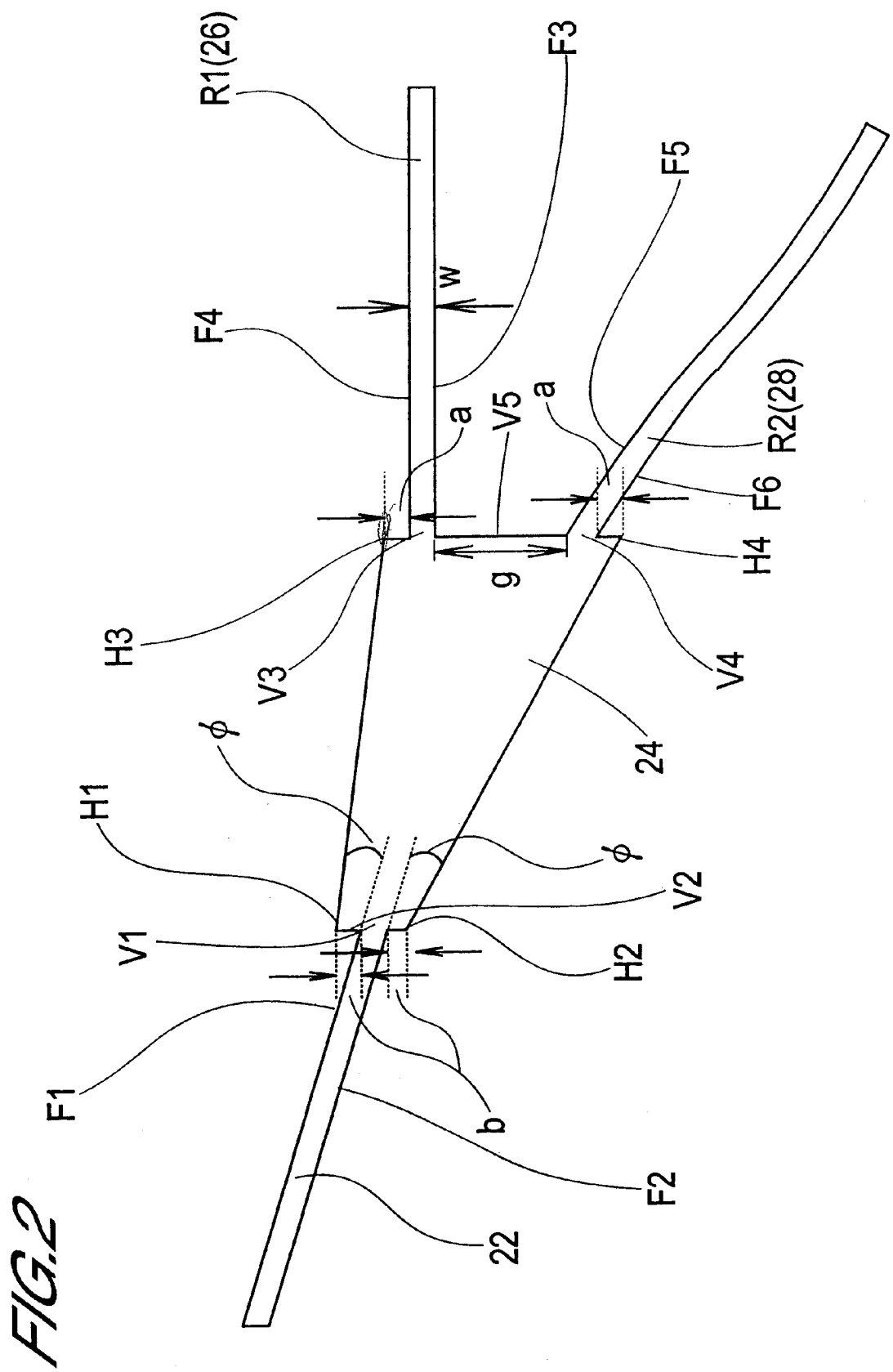
FIG. 2 is a magnification of the essential portion including the tapered waveguide of the wavelength demultiplexer of the present invention.

FIG. 1 is a schematic top view showing waveguide portions and a dielectric multilayer filter of a wavelength demultiplexer of the present invention, taken from above. FIG. 2 is a magnification of the essential portion including the tapered waveguide of the wavelength demultiplexer of the present invention, taken from above, and corresponds to a magnification of the region included by the dotted line in FIG. 1. FIG. 3 is a perspective view of a wavelength demultiplexer of the present invention.

The wavelength demultiplexer 10 of the present invention includes a wavelength demultiplexing portion 12 for demultiplexing first wavelength light S1 of a certain wavelength from wavelength multiplexing light SP that has been subjected to wavelength multiplexing, and a Y-branching waveguide 14 for propagating the demultiplexed first wavelength light S1.

In this embodiment, the wavelength demultiplexing portion 12 is a reflection-type demultiplexing portion provided with a dielectric multilayer filter 16. That is to say, the wavelength demultiplexing portion 12 includes an optical waveguide 18 for wavelength multiplexing light into which the wavelength multiplexing light SP is input, a dielectric multilayer filter 16 that transmits, first wavelength light S1 of a certain wavelength of this wavelength multiplexing light SP, and reflects second wavelength light S2 of a wavelength other than that of the first wavelength light S1, and a reflection-light waveguide 20 for propagating the reflected second wavelength light S2.

The Y-branching waveguide 14 includes a main waveguide 22 connected to the dielectric multilayer filter 16, a tapered waveguide 24 for widening the waveguide width, which is connected to the main waveguide 22, and a first branching waveguide 26 and a second branching waveguide 28, both connected to the output terminals of the tapered waveguide 24. The Y-branching waveguide 14 is for propagating the first wavelength light S1 that is output from the dielectric multilayer filter 16.

Figure 3:
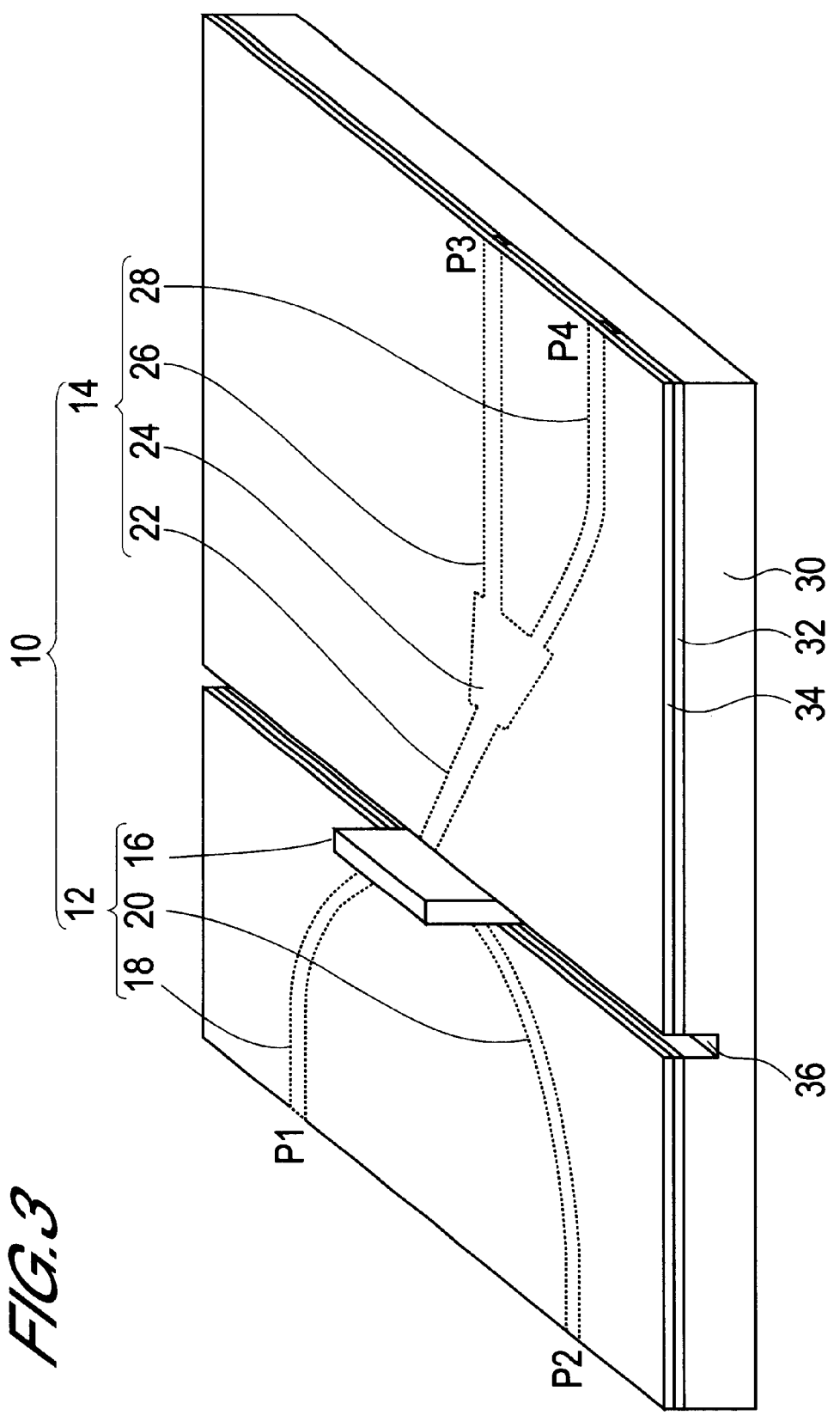
FIG. 3 is a perspective view of the wavelength demultiplexer of the present invention.

Referring to FIG. 3, the following is an explanation of an example of the configuration of such a wavelength demultiplexer 10 in accordance with the present invention.

FIG. 3 is a perspective view of the wavelength demultiplexer 10. In the configuration example shown in FIG. 3, the optical waveguide 18 for wavelength multiplexing light, the reflection-light waveguide 20, and the Y-branching waveguide 14 are all hidden below an upper cladding layer 34, so that in FIG. 3 their shape and arrangement is indicated by dotted lines on the surface of the upper cladding layer 34.

Referring to FIGS. 1 and 3, first of all, the steps for manufacturing the wavelength demultiplexer 10 are explained.

In the configuration examples explained below, a silicon substrate 30 of 1 mm thickness with parallel opposing end faces and rectangular surface shape is used for the substrate 30. A lower cladding layer 32 (quartz glass) of 20 $\mu$m thickness and a refractive index of 1.4483 is formed, for example by plasma CVD, on the silicon substrate 30. Then, Ge (germanium) or the like is injected, for example by solid-phase diffusion or by ion plating, from the surface of the lower cladding layer 32, and a core layer of 6 $\mu$m thickness is formed by adjusting the refractive index of the injection portion. Adjusting the refractive index of the core layer by solid-phase diffusion or ion plating can be achieved by techniques well known in the art, so that further detailed explanations thereof have been omitted. The core layer is used for the optical waveguide 18 for wavelength multiplexing light, the reflection-light waveguide 20, and the Y-branching waveguide 14.

As will be explained below, the present embodiment uses two kinds of light for the wavelength multiplexing light SP propagated in the optical waveguide 18 for wavelength multiplexing light, namely light of 1.3 $\mu$m wavelength and of 1.55 $\mu$m wavelength. The light with 1.3 $\mu$m wavelength corresponds to the first wavelength light S1 propagated by the Y-branching waveguide 14. The light with 1.55 $\mu$m wavelength corresponds to the second wavelength light S2 propagated by the reflection-light waveguide 20. The light with 1.3 $\mu$m wavelength can be used for example for optical signals for a telephone line, and the light with 1.55 $\mu$m wavelength can be used for example for optical signals for video images.

The optical waveguide 18 for wavelength multiplexing light, the reflection-light waveguide 20, and the Y-branching waveguide 14 are devised as single-mode waveguides propagating only the zero-order of the wavelength multiplexing light SP (light of 1.3 $\mu$m wavelength and of 1.55 $\mu$m wavelength), the second wavelength light S2 (light of 1.55 $\mu$m wavelength), and the first wavelength light S1 (light of 1.3 μm wavelength), so that the reflective index of the core of the optical waveguide 18 for wavelength multiplexing light, the reflection-light waveguide 20, and the Y-branching waveguide 14 is set to 1.4556.

To configure an optical communication module using this wavelength demultiplexer 10, these core layers are arranged at opposing parallel end surfaces of the wavelength demultiplexer 10, preferably such that light can be input and output perpendicularly to the end surfaces. This way, waveguides are achieved, by which the light that is input into or output from the wavelength demultiplexer 10 is parallel. In other words, in this wavelength demultiplexer 10, the direction in which the wavelength multiplexing light SP (light of 1.3 μm wavelength and of 1.55 μm wavelength) is input from the outside into a first port P1, which is the input port for the optical waveguide 18 for wavelength multiplexing light, the direction in which the second wavelength light S2 (light of 1.55 μm wavelength) is output to the outside from the second port P2, which is the output port for the reflection-light waveguide 20, the direction in which the first wavelength light S1 (light of 1.3 μm wavelength) is output to the outside from the third port P3, which is the output port for the first branching waveguide 26, and the direction in which the first wavelength light S1 is output to the outside from the fourth port P4, which is the output port for the second branching waveguide 28, coincide with one another (that is, they are parallel). These input and output directions of the light correspond to a first propagation direction L1.

The direction of a groove 36, into which the dielectric multilayer filter 16 is inserted, is perpendicular to the first propagation direction L1. Thus, the grooves 36 of the chips for the same series of wavelength demultiplexers 10 can be formed by dicing in one step, which enhances the production efficiency for the wavelength demultiplexer 10.

The direction in which the wavelength multiplexing light SP is input into the dielectric multilayer filter 16 corresponds to a second propagation direction L2. This second propagation direction L2 is different from the first propagation direction L1. As has been pointed out above, the dielectric multilayer filter 16 transmits the first wavelength light S1, which it outputs to the Y-branching waveguide 14, and reflects the second wavelength light S2, which it outputs to the reflection light waveguide 20.

By making the main waveguide 22, in which the direction of the center line is the second propagation direction L2, a straight waveguide, the main waveguide 22 in the wavelength demultiplexer 10 of the present invention can be made short with respect to the first propagation direction L1. Since the direction of the center line of the main waveguide 22 is the second propagation direction L2, the first wavelength light S1 can be input successfully from the dielectric multilayer filter 16, as in the case of the conventional wavelength demultiplexer A.

The following explains, how by appropriately designing the shapes of the first and the second branching waveguides 26 and 28, which are connected to the tapered waveguide 24, the direction of the center lines of the first and the second branching waveguides 26 and 28 at the third and fourth ports P3 and P4 can be made to coincide with the first propagation direction L1, and how the overall length of the Y-branching waveguide 14 in the first propagation direction L1 can be made shorter than the overall length of the Y-branching waveguide 14 in the conventional wavelength demultiplexer A.

After bending the center line of the first branching waveguide 26 along the smooth first curved line R1 away from the second branching waveguide 28, the tangential direction of the first curved line R1 is made to coincide with the first propagation direction L1. And after bending the center line of the second branching waveguide 28 along the smooth second curved line R2 away from the first branching waveguide 26, and after bending it along a smooth third curved line R3, which is connected to the second curved line R2 along the tangential direction of the second curved line R2, into a direction towards the first branching waveguide 26, the tangential direction of the third curved line R3 is made to coincide with the first propagation direction L1.

If the main waveguide 22, and the first and the second branching waveguides 26 and 28 are shaped in this manner, the overall length of the wavelength demultiplexer 10 of the present invention in the first propagation direction L1 can be made shorter.

To minimize emission loss of light at the curved portions, the curved portion of the first curved line R1 is a circular arc, the second curved line R2 is a circular arc, and the curved portion of the third curved line R3 is a circular arc. Specific values of the radii of the circular arcs for minimizing emission loss are given below.

Here, the first, second and third angles $\theta_1$, $\theta_2$ and $\theta_3$ are the center angles of the first, second and third curved lines R1, R2 and R3. The angle at which the center line of the optical waveguide 18 for wavelength multiplexing light intersects with the center line of the reflection-light waveguide 20 is $2\theta_0$. Furthermore, the tapered waveguide 24 widens up, such that the angles between the boundary line of the tapered waveguide 24 and the center line of the main waveguide 22 become φ (constant value).

This leads to the relations:

$$\theta_1 = \theta_0 - \phi \quad \text{(Eq. 1)}$$

$$\theta_3 = \theta_0 + \theta_2 + \phi \quad \text{(Eq. 2)}$$

When the circular arc portion of the third curved line R3 (see above) is connected to the second curved line R2, the overall length of the Y-branched waveguide 14 in the first propagation direction L1 becomes shortest. Consequently, the overall length of the wavelength demultiplexer 10 in the first propagation direction L1, becomes shortest, too. In the wavelength demultiplexers 10 of the present invention as explained below, the circular arc of the third curved line R3 is connected to the second curved line R2. This leads to the following equation: (Eq. 3)

$$\theta_{2\max} = \cos^{-1}\frac{r_1 \cdot \cos(\theta_0 - \phi) + r_2 \cdot \cos(\theta_0 - \phi) - r_1 + r_3 - d_1 + w + g}{r_2 + r_3} - \theta_0$$

The following is an explanation of the symbols used in FIG. 1 and in Eq. 3.

"$r_1$", "$r_2$" and "$r_3$" are the first, the second and the third radius of curvature of the first curved line R1, the second curved line R2 and the third curved line R3, respectively.

"w" is the waveguide width of the optical waveguide 18 for wavelength multiplexing light, the reflection-light waveguide 20, the main waveguide 22, the first branching waveguide 26, and the second branching waveguide 28.

"g" is the distance between the boundary of the first branching waveguide 26 and the boundary of the second branching waveguide 28 at the portion where they are connected with the tapered waveguide 24.

"d" is the distance between the center line of the first branching waveguide 26 at the third port P3 and the center line of the second branching waveguide 28 at the fourth port P4.

In the following, these parameters are set using these symbols.

As explained above, the core layers of the main waveguide 22, the tapered waveguide 24, the first branching waveguide 26, and the second branching waveguide 28 are formed in a manner that they are coupled to one another in the Y-branching waveguide 14. Furthermore, the ends of these core layers are formed in the vicinity or in continuation of one another, so that the first wavelength light S1 with 1.3 µm wavelength can be introduced from the optical waveguide 18 for wavelength multiplexing light into the Y-branching waveguide 14, and the second wavelength light S2 with 1.55 µm wavelength can be introduced into reflection-light waveguide 20. Such a vicinity of the branching of the cores is called "intersection portion".

If the Y-branching waveguide 14 is Y-shaped when viewed straight from above (see FIG. 1), then the shape of the tapered waveguide 24 is that of a trapezoid.

The upper side of this trapezoid (also referred to as "second end face V2" in the following) is the boundary between the main waveguide 22 and the tapered waveguide 24. The end face of the main waveguide 22, which opposes the second end face V2, is the first end face V1.

The lower side of the trapezoid (also referred to as "fifth end face V5" in the following) is the boundary between the tapered waveguide 24 with the first branching waveguide 26 and the second branching waveguide 28. This lower side is longer than the upper side of the trapezoid. The end faces of the first branching waveguide 26 and the second branching waveguide 28, which oppose the fifth end face V5, are the third end face V3 and the fourth end face V4.

In the following embodiments, the upper side and the lower side are perpendicular to the first propagation direction L1.

If the Y-branching waveguide 14 is viewed as a "Y", then the two edges of the second end face V2 are a first edge H1 and a second edge H2. Furthermore, the two edges of the fifth end face V5 are a third edge H3 and a fourth edge H4.

The two boundary lines of the main waveguide 22 are the first boundary line F1 and the second boundary line F2. The first branching waveguide 26 is closer to the third edge H3 than the second branching waveguide 28, and has a third boundary line F3 and a fourth boundary line F4, the latter being further away from the second branching waveguide 28. The second branching waveguide 28 is closer to the fourth edge H4 than the first branching waveguide 26, and has a fifth boundary line F5 and a sixth boundary line F6, the latter being further away from the first branching waveguide 26.

The wavelength demultiplexer 10 satisfies either one or both of the following two conditions.

The first condition is that an entire first end face V1 of the main waveguide 22 is connected to a portion of the second end face V2. In this case, the first end face V1 is enclosed by the first edge H1 and the second edge H2.

The second condition is that an entire third end face V3 of the first branching waveguide 26 and an entire fourth end face V4 of the second branching waveguide 28 are connected to portions of the fifth end face V5. In this case, the third end face V3 and the fourth end face V4 are enclosed by the third edge H3 and the fourth edge H4.

Next, an upper cladding layer 34 (quartz glass) of 20 µm thickness is formed, for example by plasma CVD, on the entire surface of the lower cladding layer 32 including the core. The refractive index of this upper cladding layer 34 is set to 1.4483, which is the same as the refractive index of the lower cladding layer 32. Forming this upper cladding layer 34, a structural unit is obtained, that has the basic structure of the reflection-type wavelength demultiplexer 10. This structural unit has buried waveguides. That is to say, this structural unit has a Y-branching waveguide 14, an optical waveguide 18 for wavelength multiplexing light, and a reflection-light waveguide 20, which are on the substrate 30, below the upper cladding layer 34 and sandwiched by the lower cladding layer 32. Incidentally, it is also possible to use a resin (for example, polymethylmetacrylate (PMMA)) for the lower and the upper cladding layers 32 and 34.

Finally, this structural unit obtained by forming the upper cladding layer 34 is subjected to dicing from the surface on the side of the upper cladding layer 34, and a straight groove 36 of 20 µm width and 200 µm depth is formed. This groove 36 extends to the silicon substrate 30. Moreover, the groove 36 is formed through the aforementioned intersection portion, in parallel to the end faces for inputting and outputting light, that is, perpendicularly to the first propagation direction L1. This groove 36 forms a straight line on the chips on which the wavelength demultiplexers 10 of one series are formed, so that the grooves 36 on chips for the same series of wavelength demultiplexers 10 can be formed by dicing in one step. Thus, the production efficiency for the wavelength demultiplexer 10 is high. The manufacturing of the reflection-type wavelength demultiplexer 10 is terminated by inserting a dielectric multilayer filter 16 into the groove 36 in the intersection portion.

In this example, the dielectric multilayer filter 16 is formed as a wavelength demultiplexing filter that reflects the second wavelength light S2 with 1.55 µm wavelength and transmits the first wavelength light S1 with 1.3 µm wavelength. For the dielectric multilayer filter 16, a conventional dielectric multilayer filter 16 can be used. Consequently, the second wavelength light S2 with 1.55 µm wavelength that has traveled along the optical waveguide 18 for wavelength multiplexing light is reflected by the dielectric multilayer filter 16, and travels along the reflection-light waveguide 20 from where it is output. On the other hand, the first wavelength light S1 with 1.3 µm wavelength that has traveled along the optical waveguide 18 for wavelength multiplexing light is transmitted by the dielectric multilayer filter 16 and input into the Y-branching waveguide 14.

The following is an explanation of the propagation routes of the light that is input into this reflection-type wavelength demultiplexer 10.

There are two types of propagation routes of the light.

The first propagation route is the one described above. That is to say, in the first propagation route, of the first wavelength light S1 with 1.3 µm and the second wavelength light S2 with 1.55 µm wavelength input from the first port P1, the first wavelength light S1 with 1.3 µm is output from the third port P3 and the fourth port P4, and the second wavelength light S2 with 1.55 µm is output from the second port P2. The optical excitation sources for the light for the first propagation route are a laser diode (not shown in the drawings) for exciting first wavelength light S1 with 1.3 µm wavelength and a laser diode (not shown in the drawings) for exciting second wavelength light S2 with 1.55 µm wavelength, which are both connected to the first port P1.

A photodiode (not shown in the drawings) for receiving second wavelength light S2 with 1.55 µm wavelength is connected to the second port P2. The second wavelength light S2 with 1.55 µm wavelength that is output from the second port P2 is input into the photodiode and converted into an electrical signal. At a later stage, this electrical signal can be converted for example into a video image, as mentioned above. The second wavelength light S2 with 1.55 µm wavelength is the signal to be received at the second port P2.

In addition, a photodiode (not shown in the drawings) for receiving first wavelength light S1 with 1.3 μm wavelength is connected to the fourth port P4. The first wavelength light S1 with 1.3 μm wavelength that is output from the fourth port P4 is input into the photodiode and converted into an electrical signal. At a later stage, this electrical signal can be converted for example into a voice signal of a telephone line, as mentioned above. The first wavelength light S1 with 1.3 μm wavelength is the signal to be received at the fourth port P4.

However, no photodiode for receiving first wavelength light S1 with 1.3 μm wavelength is connected to the third port P3. Instead, a laser diode (not shown in the drawings) for sending first wavelength light S1 with 1.3 μm wavelength is connected to the third port P3, as explained in the following. After being input by the laser diode, the first wavelength light S1 with 1.3 μm wavelength that is output from the third port P3 is discarded without being used any further.

In addition to this first propagation route, the wavelength demultiplexer 10 also has a second propagation route. These first and second propagation routes can be used simultaneously.

The optical excitation source for the second propagation route is a laser diode for exciting first wavelength light S1 with 1.3 μm wavelength, which is connected to the third port P3. In the second propagation route, first wavelength light S1 with 1.3 μm wavelength is input by this laser diode connected to the third port P3, traverses the first branching waveguide 26, the tapered waveguide 24, the main waveguide 22, the dielectric multilayer filter 16, and the optical waveguide 18 for wavelength multiplexing light, and then first wavelength light S1 with 1.3 μm wavelength is output from the first port P1. The first wavelength light S1 with 1.3 μm wavelength is the signal to be excited at the third port P3.

The first wavelength light S1 with 1.3 μm wavelength is not input into the reflection-light waveguide 20, because the main waveguide 22 is a straight waveguide provided in the second propagation direction L2, so that first wavelength light S1 with 1.3 μm wavelength that is propagated in the main waveguide 22 maintains the second propagation direction L2 when it is input into the dielectric multilayer filter 16. Since near the dielectric multilayer filter 16, the optical waveguide 18 for wavelength multiplexing light is arranged in the second propagation direction, the first wavelength light S1 with 1.3 μm wavelength is input efficiently into the optical waveguide 18 for wavelength multiplexing light. Consequently, the first wavelength light S1 with 1.3 μm wavelength is not input into the reflection-light waveguide 20.

Thus, in addition to the laser diode for exciting first wavelength light S1 with 1.3 μm wavelength and the laser diode for exciting second wavelength light S2 with 1.55 μm wavelength, a photodiode (not shown in the drawings) for receiving first wavelength light S1 with 1.3 μm wavelength is connected to the first port P1. After the first wavelength light S1 with 1.3 μm wavelength that is output from this first port P1 is input into this photodiode, it is converted into an electrical signal. As pointed out above, this electrical signal is converted for example into the voice signal of a telephone line at a later stage.

The following is a summary of these optical propagation routes. After being input into the reflection-type wavelength demultiplexer 10 from the first port P1, the first wavelength light S1 with 1.3 μm wavelength for receiving is output to the outside from the fourth port P4 and received. Moreover, after being input into the reflection-type wavelength demultiplexer 10 from the third port P3, the first wavelength light S1 with 1.3 μm wavelength for excitation is output to the outside from the first port P1 and received. Moreover, after being input into the reflection-type wavelength demultiplexer 10 from the first port P1, the second wavelength light S2 with 1.55 μm wavelength for receiving is output to the outside from the second port P2 and received.

In the following, specific parameters for the Equations 1, 2 and 3 are given, and the advantages of the wavelength demultiplexer 10 of the present invention are explained.

The first and the second embodiment have the following parameters in common:

$\phi = 0.50°$ $g = 3.5$ μm $d = 250$ μm $\theta_0 = 5°$ $\theta_1 = 9.5°$ $\theta_2 = 2.618°$ $\theta_3 = 8.118°$ $r_1 = 16$ mm $r_2 = 18.5$ mm $r_3 = 20.5$ mm $w = 8$ μm First Embodiment The wavelength demultiplexer 10 in the first embodiment satisfies the second condition. Here, when the shape of the Y-branching waveguide 14 is seen as a "Y", at the third end face V3, the fourth boundary line F4 is closer to the fourth edge H4 than the third edge H3 by the distance "a" (>0). At the fourth end face V4, the sixth boundary line F6 is closer to the third edge H3 than the fourth edge H4 by the distance "a".

Figure 4:
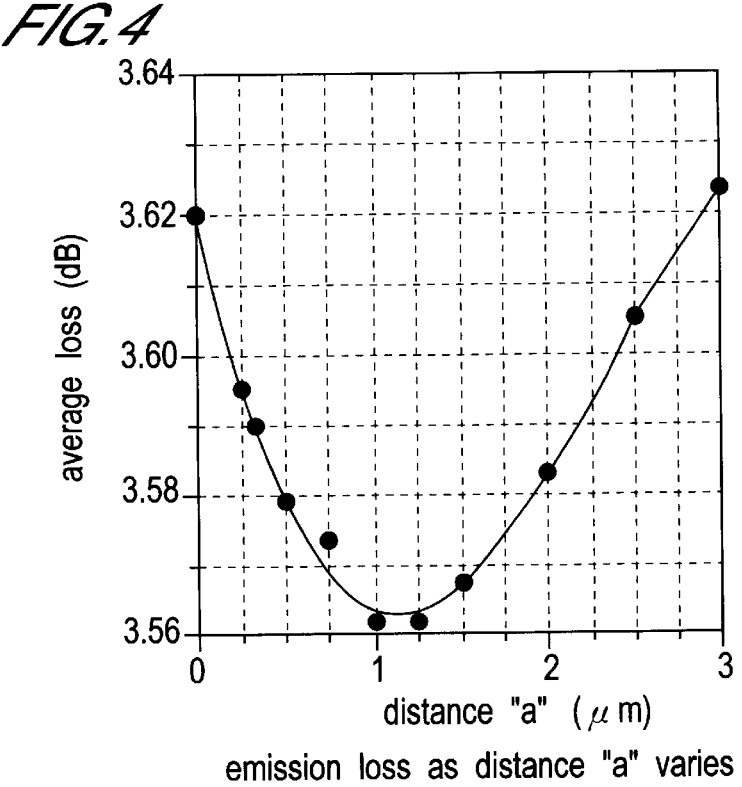
FIG. 4 is a graph showing the average value of the emission loss as the distance "a" varies.

Referring to FIG. 4, the following is an explanation of the emission loss of the first wavelength light S1 with 1.3 μm wavelength.

FIG. 4 is a graph showing the average value of the emission loss when the distance "a" varies. The ordinate represents the emission loss (in dB). The abscissa represents the distance "a" (in μm). The black dots are the values for the emission loss as calculated in a simulation, and these are connected by an approximating curve.

Here, the distance "b" (which is explained for the second embodiment) is 0 μm, and the distance "a" is changed over the range of 0 μm ≦ a ≦ 3.0 μm.

"Average value of the emission loss" means the average value between the emission loss when the first wavelength light S1 with 1.3 μm wavelength is input at the third port P3 and output from the first port P1 and the emission loss when the first wavelength light S1 with 1.3 μm wavelength is input at the first port P1 and output from the fourth port P4.

As can be seen from the approximating curve in FIG. 4, the emission loss drops as the distance "a" is increased from zero (where it is 3.62 dB). The emission loss is minimal (3.563 dB) when the distance "a" is 1 μm. Increasing the distance "a" further, the emission loss rises. At a distance of a=3.0 μm, the emission loss is practically the same as for the distance "a"=0 μm.

Thus, in particular when the distance "b"=0 μm, the effect is that the emission loss becomes smaller for 0 μm<a<3.0 μm than for "a"=0 μm. As a result, this example shows that the emission loss for (a, b)≠(0, 0) can be made smaller than the emission loss for (a, b)=(0, 0). Consequently, optical communication with the wavelength demultiplexer of the present invention poses no problems in practice.

Second Embodiment

The wavelength demultiplexer 10 of the second embodiment satisfies the first and the second conditions. Here, when the shape of the Y-branching waveguide 14 is seen as a "Y", at the first end face V1, the first boundary line F1 is the distance "b" (b>0) closer to the second edge H2 than the first edge H1. At the first end face V1, the second boundary line F2 is the distance "b" closer to the first edge H1 than the second edge H2. At the third end face V3, the fourth boundary line F4 is the distance "a" (a>0) closer to the fourth edge H4 than the third edge H3. At the fourth end face V4, the sixth boundary line F6 is closer to the third edge H3 than the fourth edge H4 by the distance "a".

Figure 5:
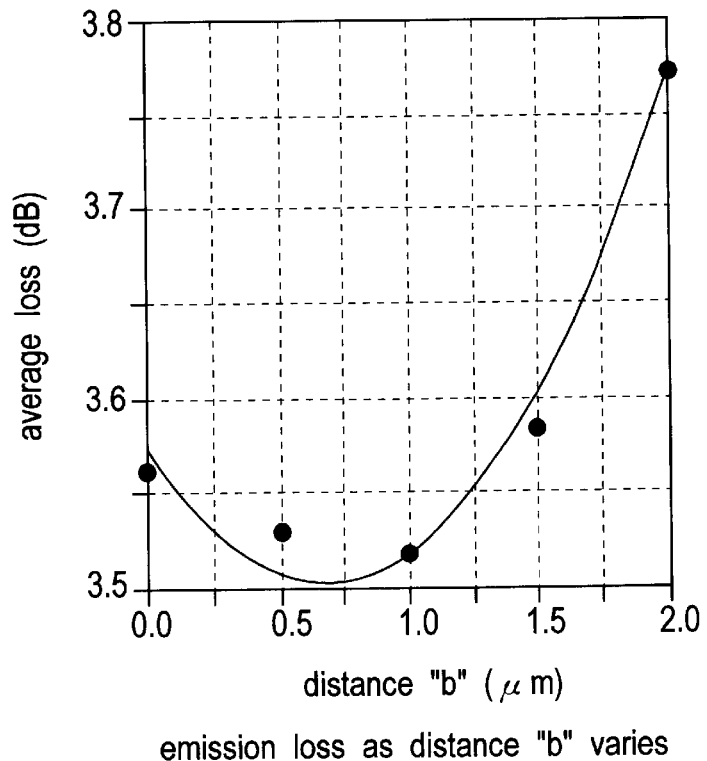
FIG. 5 is a graph showing the average value of the emission loss as the distance "b" varies.
Figure 6:
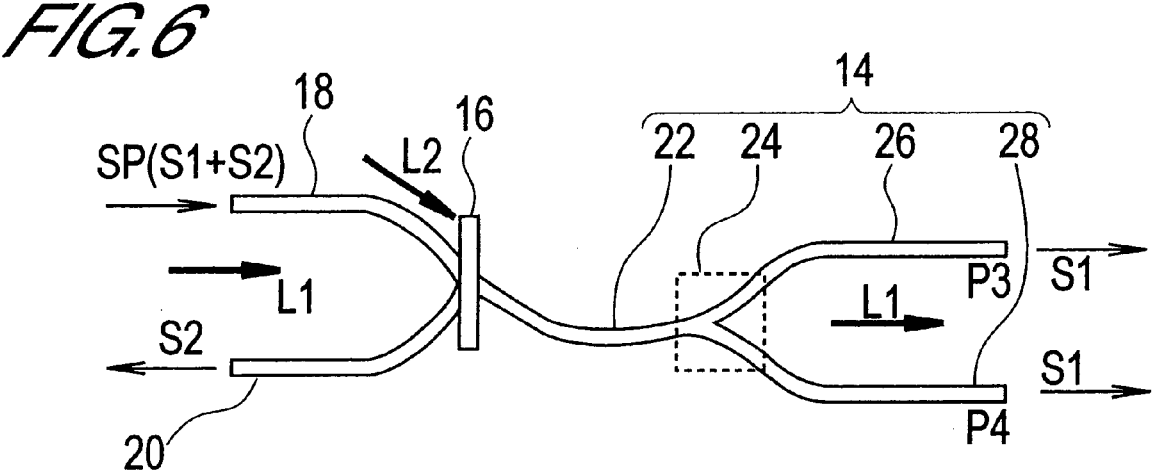
FIG. 6 is a top view showing waveguide portions and a dielectric multilayer filter of a conventional wavelength demultiplexer A.
Figure 7:
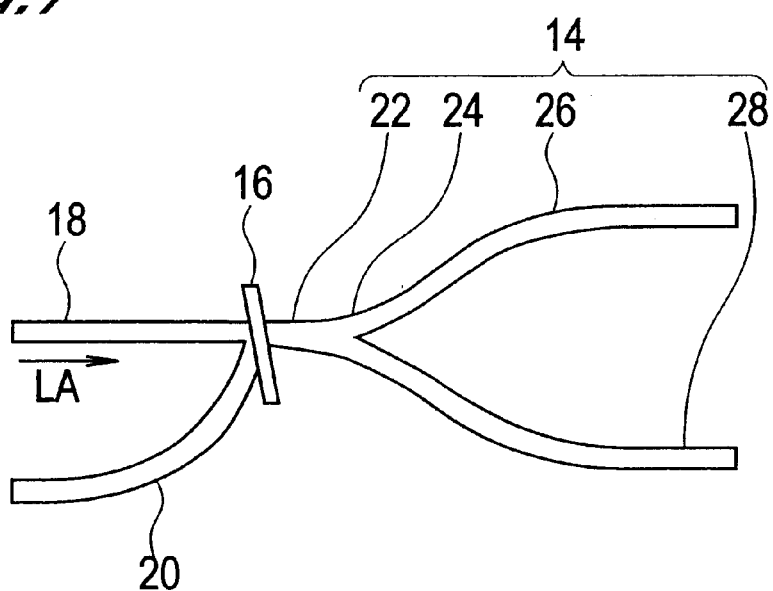
FIG. 7 is a top view showing waveguide portions and a dielectric multilayer filter of a conventional wavelength demultiplexer B.
Figure 8:
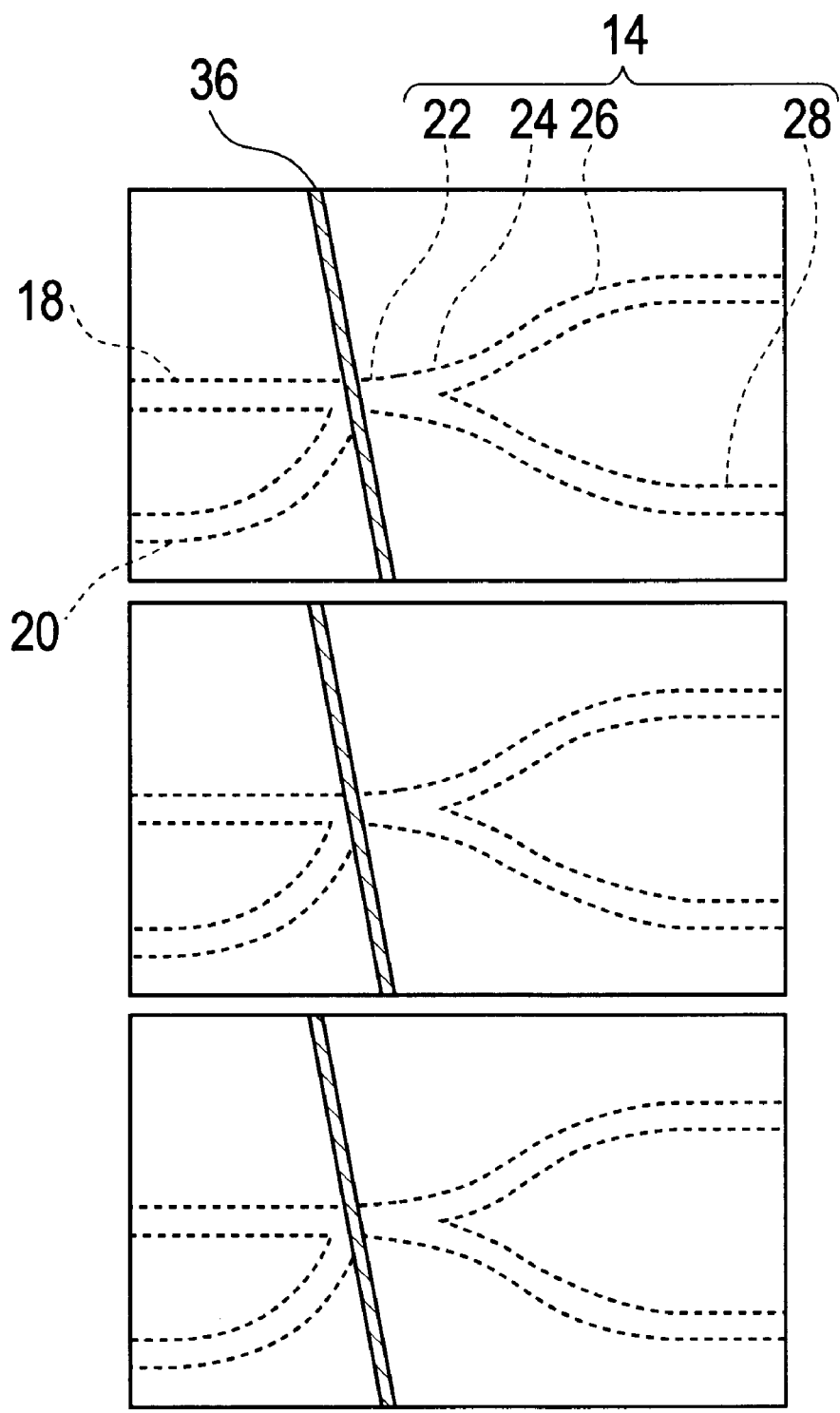
FIG. 8 is a top view of three wavelength demultiplexers B in the same series for forming wavelength demultiplexers B.
Figure 9:
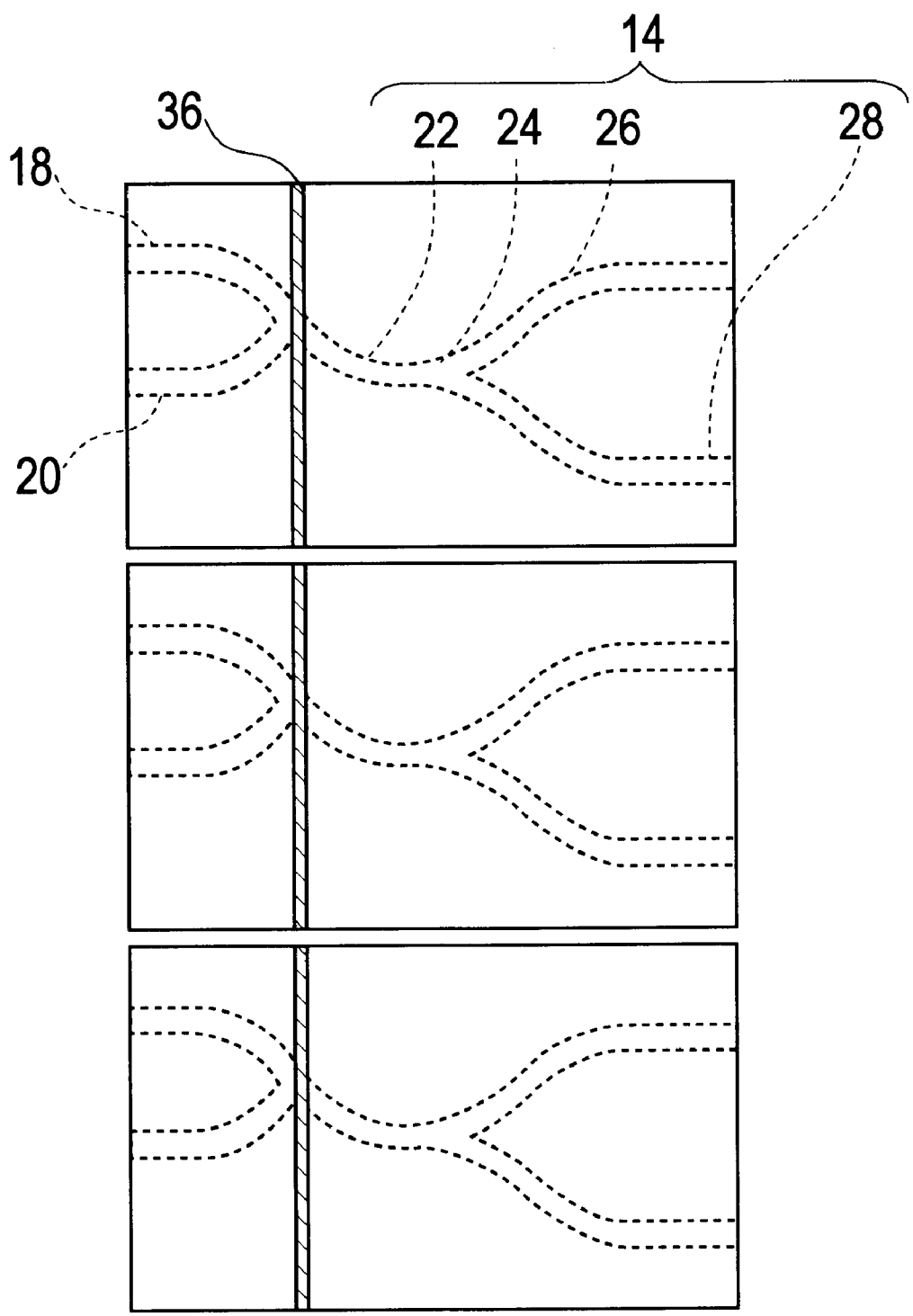
FIG. 9 is a top view of three wavelength demultiplexers A in the same series for forming wavelength demultiplexers A.

Referring to FIG. 5, the following is an explanation of the emission loss of the first wavelength light S1 with 1.3 $\mu$m wavelength in the second embodiment.

FIG. 5 is a graph showing the average value of the emission loss as the distance "b" varies. The ordinate represents the emission loss (in dB). The abscissa represents the distance "b" (in $\mu$m). The black dots are the values for the emission loss as calculated in a simulation, and these are connected by an approximating curve.

Here, the distance "a" is 1 $\mu$m, and the distance "b" is changed over the range of 0 $\mu$m≦b≦2.0 $\mu$m.

As can be seen from the approximating curve in FIG. 5, the emission loss drops as the distance "b" is increased from zero (where it is 3.57 dB). Judging from the measuring results at measuring points, the emission loss is minimal (3.51 dB) when the distance "b" is 1 $\mu$m. Increasing the distance "b" further, the emission loss rises. At a distance of b=1.25 $\mu$m, the emission loss is practically the same as for the distance "b"=0 $\mu$m.

Thus, in particular when the distance "a"=1 $\mu$m, the effect is that the emission loss becomes smaller for 0 $\mu$m<b<1.25 $\mu$m than for "b"=0 $\mu$m. As a result, this example shows that the emission loss for (a, b)≠(0, 0) can be made smaller than the emission loss for (a, b)=(0, 0), as in the first embodiment. Consequently, optical communication with the wavelength demultiplexer of the present invention poses no problems in practice.

The present invention is not limited to the above embodiments, and many design variations are possible.

For example, in the above embodiments, the core layers are formed by solid-phase diffusion or ion plating, but the formation of the core layers is not limited to these methods. For example, it is possible to form a core layer (quartz glass) of 8 $\mu$m thickness on the surface of the lower cladding layer 32, and etch core layers of 8 $\mu$m width by reactive ion etching (RIE) to form the cores for the waveguides.

In the first embodiment, only the second condition is r satisfied, whereas in the second embodiment both the first and the second condition are satisfied, but it is also possible that only the first condition is satisfied.

In the above embodiment, at the first end face V1, the first boundary line F1 is closer to the second edge H2 than the first edge H1 by the distance "b" (b>0), and at the first end face V1, the second boundary line F2 is closer to the first edge H1 than the second edge H2 by the distance "b", but it is also possible that these distances "b" differ from one another. Similarly, at the third end face V3, the fourth boundary line F4 is closer to the fourth edge H4 than the third edge H3 by the distance "a" (a>0), and at the fourth end face V4, the sixth boundary line F6 is closer to the third edge H3 than the fourth edge H4 by the distance "a", but it is also possible that these distances "a" differ from one another.

Furthermore, in the above embodiments, when the Y-branching waveguide 14 is seen as a "Y", the shape of the tapered waveguide 24 is that of a trapezoid, but there is no limitation with regard to this shape.

As becomes clear from these explanations, the overall length of the wavelength demultiplexer of the present invention in the first propagation direction is shorter than the overall length of a conventional wavelength demultiplexer A.

Furthermore, the grooves in the wavelength demultiplexer chips for the same series of the wavelength demultiplexers form a straight line. Thus, the production efficiency can be increased with the wavelength demultiplexer of the present invention.

Furthermore, the emission loss for (a, b)≠(0, 0) can be made smaller than for (a, b)=(0, 0). Consequently, optical communication with the wavelength demultiplexer of the present invention poses no problems in practice.

What is claimed is:

1. A wavelength demultiplexer comprising:

a wavelength demultiplexing portion for demultiplexing a specific wavelength of light from wavelength multiplexing light that has been input into the wavelength demultiplexer in a first propagation direction and then outputting said specific wavelength of light in a second propagation direction that is different from said first propagation direction; and a Y-branching waveguide for outputting said specific wavelength of light, which has been input thereinto in said second propagation direction, in said first propagation direction, said Y-branching waveguide comprising:

a main waveguide connected to said wavelength demultiplexing portion;

a tapered waveguide for widening a waveguide width, connected to said main waveguide; and a first branching waveguide and a second branching waveguide, which are both connected to said tapered waveguide;

wherein said main waveguide is a straight waveguide whose center line is oriented in said second propagation direction;

wherein, after bending the center line of said first branching waveguide along a smooth first curved line away from said second branching waveguide, a tangential direction of said first curved line coincides with said first propagation direction;

wherein, after bending the center line of said second branching waveguide along a smooth second curved line away from said first branching waveguide, and after bending the center line along a smooth third curved line, which is connected to said second curved line in the tangential direction of said second curved line, into a direction towards said first branching waveguide, the tangential direction of said third curved line coincides with said first propagation direction;

wherein, a shape of the Y-branching waveguide is a "Y", and either one or both of a first condition and a second condition is satisfied;

the first condition being that an entire first end face of said main waveguide is connected to a portion of a second end face of said tapered waveguide arranged in opposition to said first end face; and the second condition being that an entire third end face of said first branching waveguide and an entire fourth end face of said second branching waveguide are connected to a portion of a fifth end face of said tapered waveguide, respectively, said fifth end face being arranged in opposition to said third end face and said fourth end face.

2. A wavelength demultiplexer according to claim 1, wherein a shape of said second end face and of said fifth end face is substantially a straight line;

wherein when the two edges of said second end face are a first edge and a second edge and the two edges of said fifth end face are a third edge and a fourth edge, said first end face in said first condition is enclosed by said first edge and said second edge; and said third end face and said fourth end face in said second condition are enclosed by the third edge and the fourth edge.

3. A wavelength demultiplexer according to claim 2, wherein, when said first and said second conditions are satisfied, said main waveguide comprises a first boundary line and a second boundary line;

said first branching waveguide has a third boundary line and a fourth boundary line, the latter being further away from said second branching waveguide;

said second branching waveguide has a fifth boundary line and a sixth boundary line, the latter being further away from said first branching waveguide;

wherein at said first end face, said first boundary line is closer to said second edge than said first edge by the distance "b" (b>0);

at said first end face, said second boundary line is closer to said first edge than said second edge by said distance "b";

at said third end face, said fourth boundary line is closer to said fourth edge than said third edge by the distance "a" (a>0); and at said fourth end face, said sixth boundary line is closer to said third edge than said fourth edge by the distance "a".

4. A wavelength demultiplexer according to claim 2, wherein, when said first condition is satisfied, said main waveguide comprises a first boundary line and a second boundary line;

said first branching waveguide has a third boundary line and a fourth boundary line, the latter being further away from said second branching waveguide;

said second branching waveguide has a fifth boundary line and a sixth boundary line, the latter being further away from said first branching waveguide;

at said first end face, said first boundary line is closer to said second edge than said first edge by said distance "b" (b>0); and at said first end face, said second boundary line is closer to said first edge than said second edge by said distance "b".

5. A wavelength demultiplexer according to claim 2, wherein, when said second condition is satisfied, said main waveguide comprises a first boundary line and a second boundary line;

said first branching waveguide has a third boundary line and a fourth boundary line, the latter being from said second branching waveguide;

said second branching waveguide has a fifth boundary line and a sixth boundary line, the latter being from said first branching waveguide;

at said third end face, said fourth boundary line is closer to said fourth edge than said third edge by said distance "a" (a>0); and at said fourth end face, said sixth boundary line is closer to said third edge than said fourth edge by said distance "a".

6. A wavelength demultiplexer according to claim 3, wherein when the widths of said main waveguide, said first branching waveguide and said second branching waveguide are 8 $\mu$m;

the thicknesses of said main waveguide, said first branching waveguide and said second branching waveguide are 6 $\mu$m; and the distance between said third boundary line at said third end face and said fifth boundary line at said fourth end face is 3.5 $\mu$m, then the distance "a" is 1 $\mu$m, and the distance "b" is a constant value in the range of 0 $\mu$m<b<1.25 $\mu$m.

7. A wavelength demultiplexer according to claim 5, wherein when the widths of said main waveguide, said first branching waveguide and said second branching waveguide are 8 $\mu$m;

the thicknesses of said main waveguide, said first branching waveguide and said second branching waveguide are 6 $\mu$m;

the distance between said third boundary line at said third end face and said fifth boundary line at said fourth end face is 3.5 $\mu$m, then the distance "b" is 0 $\mu$m, and the distance "a" is a constant value in the range of 0 $\mu$m<a<3.0 $\mu$m.

8. A wavelength demultiplexer according to claim 1, wherein a curved portion of said first curved line is a circular arc.

9. A wavelength demultiplexer according to claim 1, wherein said second curved line is a circular arc; and wherein a curved portion of said third curved line is a circular arc.

10. A wavelength demultiplexer according to claim 9, wherein said circular arc, which is a curved portion of said third curved line, is connected to said second curved line.

11. A wavelength demultiplexer according to claim 1, wherein said wavelength demultiplexing portion is a reflection-type wavelength demultiplexing portion using a dielectric multilayer filter.

* * * * *